(12) United States Patent
Christ et al.

(10) Patent No.: US 8,641,320 B2
(45) Date of Patent: Feb. 4, 2014

(54) FRONT DRIVE OF A ROAD PAVER AND A METHOD FOR CONTROLLING THE FRONT DRIVE

(75) Inventors: Hermann Christ, Bubach (DE); Irina Hagen, Halsenbach (DE); Moritz Nick, Boppard (DE)

(73) Assignee: BOMAG GmbH, Boppard (DE)

( * ) Notice: Subject to any disclaimer, the term of this patent is extended or adjusted under 35 U.S.C. 154(b) by 159 days.

(21) Appl. No.: 13/086,870

(22) Filed: Apr. 14, 2011

(65) Prior Publication Data

US 2011/0262227 A1 Oct. 27, 2011

(30) Foreign Application Priority Data

Apr. 14, 2010 (DE) .......................... 10 2010 014 901

(51) Int. Cl.
*E01C 19/00* (2006.01)

(52) U.S. Cl.
USPC .......................................... 404/83; 404/84.05

(58) Field of Classification Search
USPC .................... 404/83, 84.05, 96, 105
See application file for complete search history.

(56) References Cited

U.S. PATENT DOCUMENTS 3,774,401 A * 11/1973 Allen ............................. 60/420
3,865,207 A * 2/1975 Schwab et al. ................ 180/253
4,219,093 A * 8/1980 Lang ............................. 180/401
4,528,871 A * 7/1985 Nembach ..................... 74/733.1
4,766,727 A * 8/1988 Dull et al. ...................... 60/427
5,819,870 A 10/1998 Braun

FOREIGN PATENT DOCUMENTS

DE 3911229 A1 10/1990
EP 0916541 A1 5/1999
JP 6166344 A 6/1994

OTHER PUBLICATIONS

The International Bureau of WIPO, International Preliminary Report on Patentability and Written Opinion of the International Searching Authority, International Application No. PCT/EP2011/001909, Dated Oct. 16, 2012 (8 pages).

* cited by examiner

*Primary Examiner* — Matthew D Troutman
(74) *Attorney, Agent, or Firm* — Wood, Herron & Evans, LLP

(57) ABSTRACT

A road paver for laying road construction material comprises a tamping beam, a bunker for receiving road construction material, a wheeled chassis with a rear axle and a steerable front axle, and a hydraulic arrangement for permanent or optionally selectable drive of hydraulic motors which are coupled to the front wheels. A method for tractive power control and for drive slip limitation of the front drive of a road paver is also disclosed.

15 Claims, 2 Drawing Sheets

FRONT DRIVE OF A ROAD PAVER AND A METHOD FOR CONTROLLING THE FRONT DRIVE

The present application claims priority under 35 U.S.C. §119 of German Patent Application No. 10 2010 014 901.2, filed Apr. 14, 2010, the disclosure of which is hereby incorporated herein by reference in its entirety.

FIELD OF THE INVENTION

The present invention relates to a road paver for laying road construction material, comprising a tamping beam, a bunker for receiving road construction material, a wheeled chassis with a rear axle and a steerable front axle, and a hydraulic arrangement for permanent or optionally selectable drive of hydraulic motors which are coupled to the front wheels. The invention further relates to a method for tractive power control and for drive slip limitation of the front drive of a road paver.

BACKGROUND OF THE INVENTION

Road pavers with wheeled chassis are characterized by their mobility and versatility in comparison with those with crawler tracks. The wheeled chassis of road pavers are usually equipped with a permanent rear-wheel drive and an additional front-wheel drive, which can be selected when needed, e.g., for increasing traction in working operation. It is difficult to ensure optimal traction in the case of external influences such as different frictional conditions for example, changing axial load of the front axle, etc, so that a slip-free drive with maximum tractive power is achieved.

So-called "load-sensing systems" have prevailed in the area of hydraulic drive systems which are usually used for construction machines. The pump pressure is controlled in such a way for minimizing power losses and for the required supply of several hydraulic consumers in such a way that a constant excess pressure is maintained over the consumer with the highest load. This excess pressure, which is typically between 20 and 30 bars, is usually set via the spring pretension in the actuating cylinder of the variable displacement pump. There is a demand to further reduce the power loss which is composed of the excess pressure and the transport stream.

Road pavers are known for limiting the drive slip which recognize a deviation of the actual speed from the reference speed by means of continual monitoring of the speed for each wheel, and optionally counteract this by speed limitation. It is disadvantageous in this respect that the complexity of the sensor system and the control is too high.

The present invention is therefore based on the object of optimally controlling the tractive power of the permanent or optionally selectable front wheel drive and to actively limit at the same time any occurring wheel slip in the front wheels. It is further an object of the present invention to reduce the complexity of the control and also the costs.

SUMMARY OF THE INVENTION

The road paver in accordance with one embodiment of the present invention for laying road construction material comprises a tamping beam, a bunker for receiving road construction material and a wheeled chassis with a rear axle with at least two permanently driven rear wheels and a steerable front axle, which is a single or tandem axle, comprising "$n_1$", preferably 2 or 4, front wheels. The road paver in accordance with one embodiment of the present invention further comprises means for determining the axle load, the steering angle, and the working speed of the road paver. In accordance with one aspect of the present invention, a hydraulic arrangement is provided for the permanent or optionally selectable drive of "$n_2$" hydraulic motors which are each coupled to one front wheel.

The hydraulic arrangement in accordance with one embodiment of the present invention comprises "$n_3$" control valves with throttles, with the cross sections of the throttles being individually adjustable, and "$n_4$" pressure balances with $n_4-1$ shuttle valves. The hydraulic arrangement further comprises a variable displacement pump, a pump with pressure and transport flow control. An electronic control unit is further provided which is arranged in such a way that it predetermines a reference differential pressure between a pump pressure downstream of the variable displacement pump/upstream of the control valves and a highest load pressure downstream of the pressure balances/upstream of the hydraulic motors.

The hydraulic arrangement in accordance with one embodiment of the present invention further comprises a pressure measuring apparatus for determining an actual differential pressure between the pump pressure and the highest load pressure and a pump control valve for adjusting the transport flow of the variable displacement pump, which valve is arranged in such a way that it adjusts the actual differential pressure to the reference differential pressure.

The present invention is based on the finding that the pressure difference between the pump pressure and the highest load pressure can be used in a simple way as a control variable for optimizing traction. As a result, not only the maximum tractive power for the front wheels is achieved, but slip is also effectively limited. There are no additional expenses for expensive sensor systems, actuator systems or control units because only components are used that are already known.

Instead of the signal line for the highest load pressure on the variable displacement pump, a pump control valve such as a conventional proportional valve is used for determining the load-sensing pressure in order to enable performing the dosing of the tractive power. It is simultaneously also possible with this pump control valve to actively limit the drive slip by taking into account the deviation of the actual differential pressure from the reference differential pressure, in that the variable displacement pump is adjusted accordingly in such a way that the actual differential pressure is adjusted towards the reference differential pressure.

The method in accordance with one embodiment of the present invention for tractive power control and drive slip limitation for the front drive of a road paver comprises the steps of determining optimal differential pressures between the pump pressure and the highest load pressure for any operating point depending on the axle load of the front axle, the steering angle and the working speed on a test stand, and saving the determined differential pressures in the form of characteristics/characteristic maps in an electronic control unit (ECU).

The optimal differential pressures can also be determined with a model of the running time dependent on variables as axle load of the front axle and the working speed. This model includes the mathematical description of the differential pressure as a function of the axle load of the front axle and the working speed.

The reference differential pressure between the pump pressure and the load pressure results from the choice of the valve plunger and the requested amount (speed). This is a fixed value dependent on the flow rate. If the differential pressure increases, this is an indicator that more tractive power is provided than can be transferred. This means a power loss. If the differential pressure is smaller than expected, it means that more tractive power could be transferred.

The current operating point is then determined in operation. On the basis of this operating point, the reference differential pressure determined previously on the test stand is output as a reference variable depending on the momentary operating point. Once the actual differential pressure has been determined, for which purpose a differential pressure sensor or two simple pressure sensors can be used, the actual differential pressure can be adjusted towards the reference differential pressure when there is a deviation.

The desired differential pressures can be determined on the test stand for each consumer, which in this case is the hydraulic motor, under variation of the influencing variable of axle load, steering angle and driving speed.

Allocation of quantities occurs in operation separately for each motor by throttling control valves, e.g., proportional valves. It applies that the volume flow (Q) in the valve depends on the opening cross section A of the throttle in the control valve. It is a function of the electric current (I) on the other hand, which flows through the electromagnetic adjusting apparatus of the proportional valve. The quantity is allocated by taking into account the speed or rotational speed of the rear axle in such a way that the circumferential speed of the front wheels corresponds to that of the rear wheel. It is known that the volume flow is proportional to the cross section of the throttle. The speed of the hydraulic motor or the wheel speed is determined with the predetermination of the throttle cross section.

The dosing of the tractive power occurs via the load-sensing pressure in the pump which can be dosed proportionally by means of the pump control valve. The differential pressure between the pump and the highest load pressure is used as an indicator for the slip threshold. The flow at the pump control valve will be increased for such a time until the pressure difference between the pump pressure and the highest load pressure is larger than expected. The front wheels would theoretically spin in this case, which is prevented in such a way however that the transport quantity is defined via the control valves. In order to prevent power losses due to a high pressure difference, the pressure at the pump control valve is reduced until the reference differential pressure has been reached again.

It is possible to perform a pilot control according to the axial load at the front, e.g., via measurement of the cylinder pressures. It is also possible to perform the pilot control according to the pressure at the rear (tractive power on the rear axle) with respective advance.

There is also the possibility to provide the flow of the pump control valve of the variable displacement pump as a reference value. A pressure sensor could be saved in this way.

The allocation of tractive power to the front wheels is possible without an axle load indicator in that the tractive power on the rear wheels is detected by means of a pressure sensor. The pressure on the front axle could be adjusted proportional to this pressure. It is disadvantageous however that depending on its position only the tamping beam weight is to be used as a partial variable for determining the axle load and thus the allocation of tractive power.

The electronic control unit preferably comprises characteristics/characteristic maps which show the respective reference differential pressure for each operating point. The optimal reference differential pressure can also be determined as described above. The electronic control unit can have a conventional configuration with a memory.

According to an advantageous embodiment of the present invention, the operating point can be determined depending on the axle load of the front axle, steering angle and the working speed.

Preferably, the means for determining the axle load of the front axle comprise a position sensor which indicates the position of the tamping beam with respect to the laid road construction material. This position sensor can be a conventional displacement sensor for example which detects the piston stroke. The weight of the tamping beam can be used for determining the axle load of the front axle.

To determine the axle load of the front axle dependent on the position of the tamping beam, three conditions are distinguished: the tamping beam is in its upper position, the tamping beam is its lower position (swimming position) and the tamping beam is in its lower position with active beam load release. The information on the condition is available in the electronic control unit. Upon active beam release, the respective release pressures (left, right) applied to the cylinders below are known. These pressures are either directly measured or can be determined due to the valve control and the respective characteristics.

The means for determining the axle load of the front axle preferably further comprise a filling level sensor, especially an ultrasonic sensor, which indicates the filling level of the bunker. Contactless sensors are known which indicate the filling level, so that the weight of the road construction material can be included in the calculation of the axle load. Means for detecting the steering angle can be displacement sensors or angle meters. The means for detecting the working speed of the road paver are preferably speed sensors on the rear axle. Further options for axle load determination are possible: plug gauges on the mounting of the front axle, pressure measurement at the cylinders for the adjustment of the front axle mounting, and pressure measurement at the hydraulic cylinders applied to the levers of a bogie axle, respectively.

It is provided according to a further embodiment of the present invention that the pump control valve is a proportional valve. The pressure and thus the tractive power can be finely dosed with the help of the same.

Preferably, the control valves are 2/2-proportional directional control valves with continuously adjustable throttle cross sections. This enables precise allocation of quantities. The possibility is also similarly provided to switch off individual hydraulic motors if only two of four front wheels are to be driven in addition to the rear wheels.

According to a further advantageous embodiment of the present invention, the electronic control unit comprises characteristics/characteristic maps for determining the reference flow for each control valve. For this purpose, the valve characteristics are stored in the electronic control unit, so that the control valves can be triggered directly by the electronic control unit.

BRIEF DESCRIPTION OF THE DRAWINGS

The present invention will be explained in closer detail by reference to the figures.

DETAILED DESCRIPTION OF THE INVENTION

Figure 2:
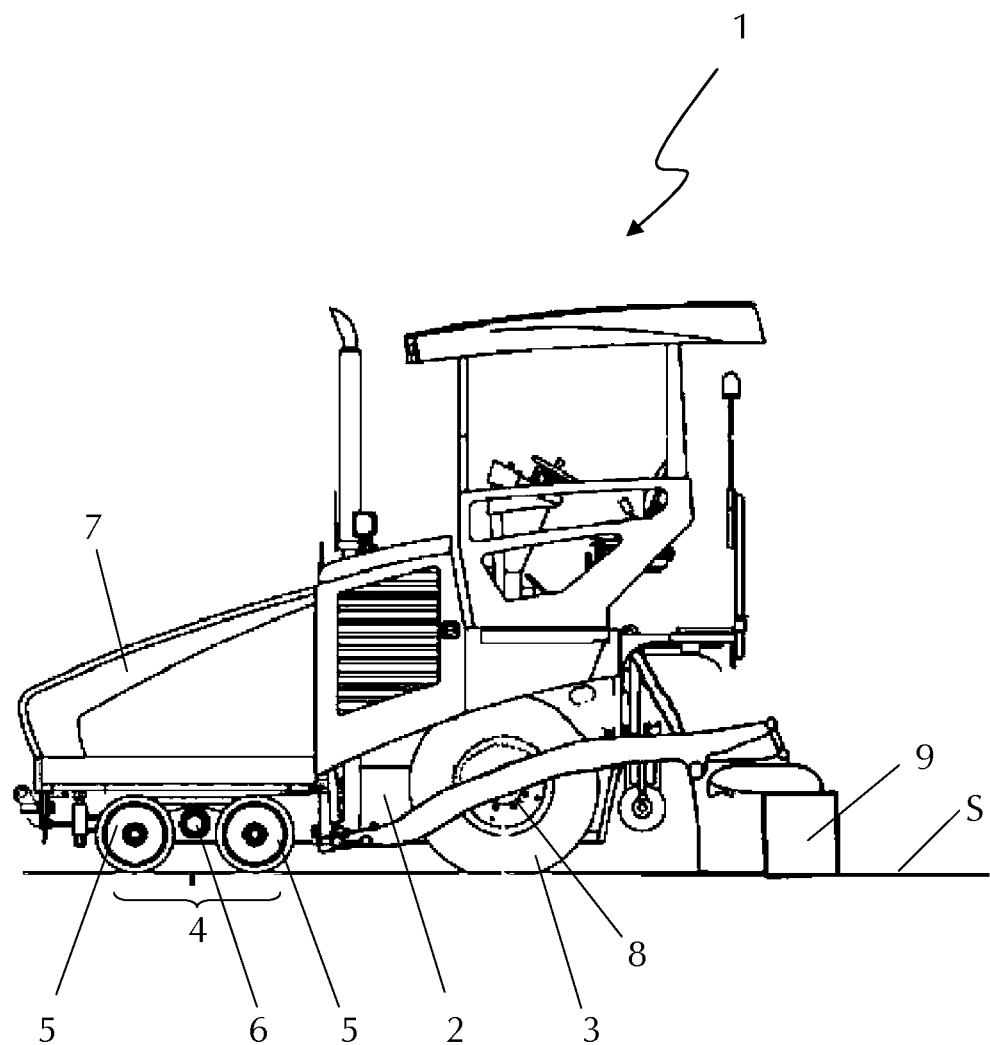
FIG. 2 shows a schematic view of an exemplary road paver.

FIG. 2 shows an exemplary road paver 1 having at the front side a bunker 7 for receiving road construction material and at the rear side a distribution device for the construction material. The construction material is distributed by the distribution device on a surface S and is smoothed by a tamping beam 9.

Figure 1:
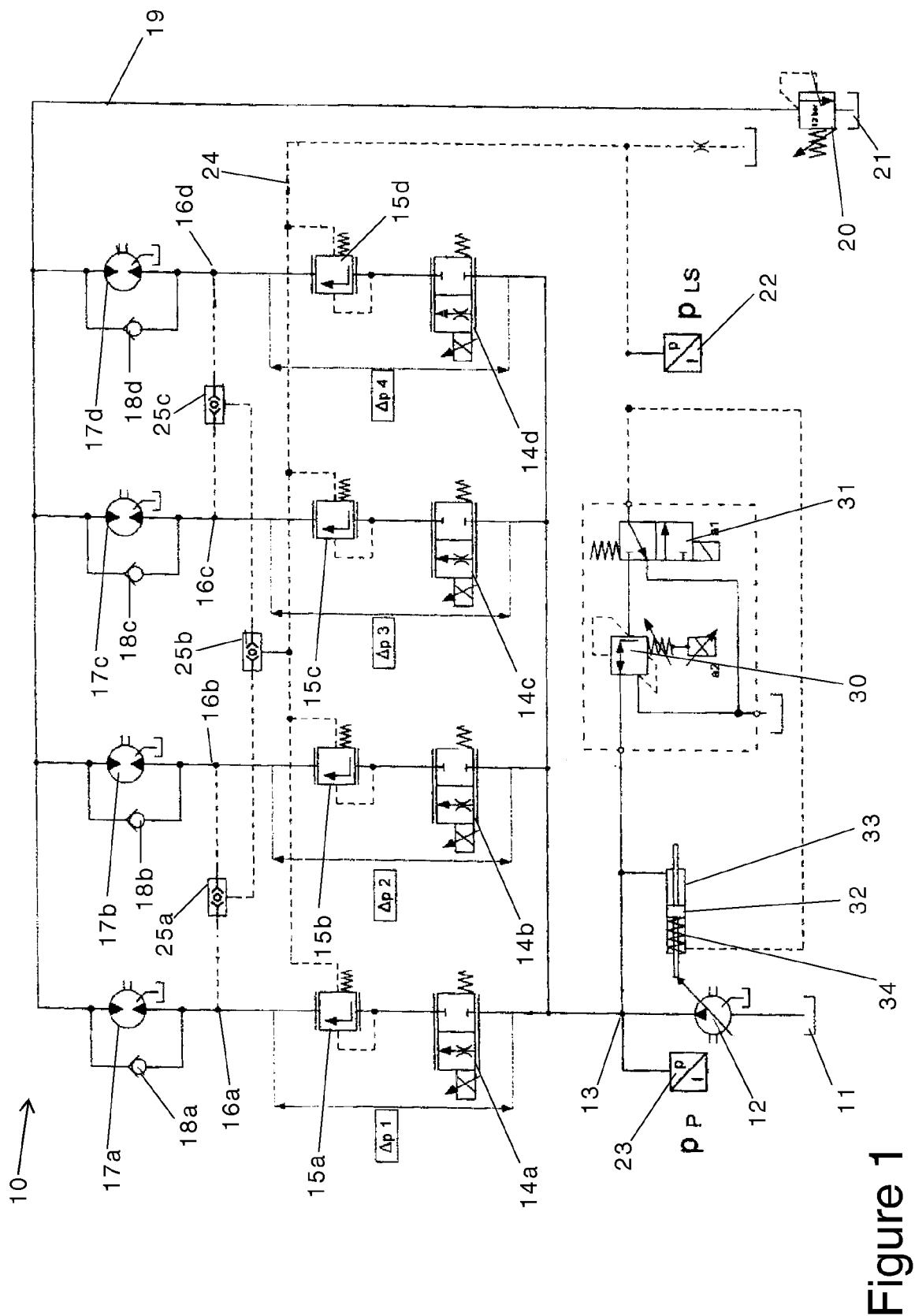
FIG. 1 schematically shows the hydraulic connection diagram of the hydraulic arrangement in accordance with one embodiment of the present invention.

The road paver 1 comprises a wheeled chassis 2 provided with a rear axle 8 bearing two rear wheels 3 and further comprises a steerable front axle 6. The front axle 6 comprises a pair of tandem axles 4. The tandem axles 4 each comprise two front wheels 5. The front wheels 5 are driven by the hydraulic motors 17a, 17b, 17c and 17d (FIG. 1). The side view of FIG. 2 only shows the left side rear wheel 3 and the left side tandem axle 4 with its two front wheels 5.

The variable displacement pump 12, which is driven by a diesel engine (not shown), for example, supplies the consumers consisting of the four hydraulic motors 17a, 17b, 17c, 17d with hydraulic oil from the tank 11. The pump pressure "$p_p$" can be detected for example at point 13 via a pressure measuring apparatus 23. The transport flow of the variable displacement pump 12 is divided among the individual consumers 17a to 17d. Each consumer is supplied via throttling control valves which are arranged as proportional directional control valves 14a to 14d. The control valves, which can be triggered individually via an electronic control unit (not shown), can continually adjust their throttle cross sections. According to the known throttle equation, the volume flow is proportional to the opening cross section. As a result, the opening cross section determines the speed of the hydraulic motor. Each control valve 14a to 14d is provided downstream with a pressure balance 15a to 15d. The pressure balances 15a to 15d are proportional pressure control valves, with the highest load pressure "$p_{LS}$" being applied to each of the pressure balances 15a to 15d. The pressure balances 15a to 15d ensure a controlled volume flow in that the pressure drop $\Delta p1 - \Delta p2$ on the control valves 14a to 14d is kept constant irrespective of fluctuations.

Shuttle valves 25a to 25c are switched at the points 16a to 16d and among each other in such a way that the highest load pressure is always in line 24. This highest load pressure "$p_{LS}$" can be detected via a pressure measuring apparatus 22 for example. The hydraulic oil consumed in the motors 17a to 17d leaves the hydraulic arrangement 10 via the line 19. A prestress valve 20 can be provided for ensuring a minimum pressure, e.g., 12 bars, on the low-pressure sides of the motors 17a to 17d. Each hydraulic motor 17a to 17d preferably comprises a replenishing valve 18a to 18d for hydraulic free-wheeling when the rear axle is faster.

The pressure difference $\Delta p = p_p - p_{LS}$ is used in accordance with one embodiment of the present invention as a control variable for optimal traction. The values for the reference differential pressures as determined on the test stand are saved in the electronic control unit. Depending on the operating point, there is a reference differential pressure which needs to be maintained in order to realize slip-free front drive with maximum tractive power. The pump control valve 30 controls the transport stream of the variable displacement pump 12 in such a manner that the actual differential pressure corresponds to a predetermined reference differential pressure for each opening cross section. In contrast to the usual load-sensing systems, the differential pressure is not determined for all operating points but can be chosen variably in order to achieve optimum results in respect of efficiency with maximum tractive power and slip limitation. For the purpose of adjusting the variable displacement pump 12, a spring-loaded hydraulic piston 32 is provided which is supplied on the right side 33 with the pump pressure and on the left side 34 with the reduced pressure of the pump control valve 30 and the spring force. The position of the hydraulic piston 32 will be changed when the equilibrium of forces between the right side 33 and the left side 34 is changed for example by changes in the throttled cross sections of the proportional valves 14a to 14d. It is possible to intervene in the control by directly triggering the pump control valve 30.

While the present invention has been illustrated by description of various embodiments and while those embodiments have been described in considerable detail, it is not the intention of Applicants to restrict or in any way limit the scope of the appended claims to such details. Additional advantages and modifications will readily appear to those skilled in the art. The invention in its broader aspects is therefore not limited to the specific details and illustrative examples shown and described. Accordingly, departures may be made from such details without departing from the spirit or scope of Applicants' invention.

What is claimed is:

1. A road paver for laying road construction material, comprising:
    a tamping beam;
    a bunker for receiving road construction material;
    a wheeled chassis with a rear axle with at least two permanently driven rear wheels and with a steerable front axle comprising a single or tandem axle, and further comprising $n_1$ front wheels, with $n_1$ not equal to zero;
    means for determining the axle load of the front axle, the steering angle and the working speed of the road paver, and
    a hydraulic arrangement for permanent or optionally selectable drive of $n_2$ hydraulic motors, with $n_2$ not equal to zero, which are each coupled to a front wheel, with the hydraulic arrangement comprising:
    $n_3$ control valves with throttles, with $n_3$ not equal to zero, and with a cross section of each of the throttles being individually adjustable;
    $n_4$ pressure balances, with $n_4$ not equal to zero;
    a variable displacement pump;
    an electronic control unit which is configured so that it predetermines a reference differential pressure between a pump pressure ($p_p$) downstream of the variable displacement pump/upstream of the control valves and a highest load pressure ($p_{LS}$) downstream of the pressure balances/upstream of the hydraulic motors;
    a pressure measuring apparatus for determining an actual differential pressure between the pump pressure ($p_p$) and the highest load pressure ($p_{LS}$); and
    a pump control valve for adjusting the transport stream of the variable displacement pump, which is arranged in such a way that it adjusts the actual differential pressure to the reference differential pressure.

2. The road paver according to claim 1, whereby the pressure balances comprise $n_4 - 1$ shuttle with $n_4 - 1$ not to zero.

3. The road paver according to claim 1, whereby the electronic control unit comprises characteristics/characteristic maps in which an associated reference differential pressure for each operating point is shown.

4. The road paver according to claim 1, whereby an operating point can be determined depending on the axle load of the front axle, the steering angle and the working speed.

5. The road paver according to claim 1, whereby the means for determining the axle load of the front axle comprise means to determine the tamping beam in an upper position, the tamping beam in a swimming position and the tamping beam in a lower position with active beam load release.

6. The road paver according to claim 1, whereby the means for determining the axle load of the front axle comprise a filling level sensor which indicates the filling level of the bunker.

7. The road paver according to claim 1, whereby the means for determining the axle load of the front axle comprise plug gauges on a mounting of the front axle.

8. The road paver according to claim 1, whereby the means for determining the axle load of the front axle comprise pressure measurement means at cylinders for an adjustment of a front axle mounting.

9. The road paver according to claim 1, whereby the means for determining the axle load of the front axle comprise pressure measurement means at hydraulic cylinders applied to levers of a bogie axle.

10. The road paver according to claim 1, whereby the pump control valve is a proportional valve.

11. The road paver according to claim 1, whereby the control valves are 2/2-proportional directional control valves with continuously adjustable throttle cross sections.

12. The road paver according to claim 1, whereby the electronic control unit comprises characteristics/characteristic maps for determining a reference flow for each control valve.

13. A method for tractive power control and drive slip limitation for a front drive of the road paver according to claim 1, comprising the following steps:

determining optimal differential pressures between the pump pressure ($p_p$) and the highest load pressure ($p_{LS}$) for every operating point depending on the axle load of the front axle, the steering angle and the working speed on a test stand; saving the determined differential pressures in the form of characteristics/characteristic maps in the electronic control unit;

determining every operating point;

determining the reference differential pressure depending on a momentary operating point;

determining the actual differential pressure, and adjusting the actual differential pressure to the reference differential pressure.

14. The road paver according to claim 1, wherein the steerable front axle comprises two or four front wheels.

15. The road paver according to claim 6, wherein the filling level sensor comprises an ultrasonic sensor.

* * * * *